United States Patent
Shusterman

(10) Patent No.: US 9,554,350 B1
(45) Date of Patent: Jan. 24, 2017

(54) SYSTEMS AND METHODS FOR WIRELESS DEVICE ATTACHMENT IN A COMMUNICATION NETWORK

(71) Applicant: Sprint Spectrum LP, Overland Park, KS (US)

(72) Inventor: Alex Shusterman, Vienna, VA (US)

(73) Assignee: Sprint Spectrum L.P., Overland Park, KS (US)

(*) Notice: Subject to any disclaimer, the term of this patent is extended or adjusted under 35 U.S.C. 154(b) by 111 days.

(21) Appl. No.: 14/497,563

(22) Filed: Sep. 26, 2014

(51) Int. Cl.
*H04W 60/00* (2009.01)
*H04W 8/02* (2009.01)
*H04W 88/16* (2009.01)

(52) U.S. Cl.
CPC ............ *H04W 60/00* (2013.01); *H04W 8/02* (2013.01); *H04W 88/16* (2013.01)

(58) Field of Classification Search
CPC ......... H04W 60/00; H04W 8/02; H04W 88/16
See application file for complete search history.

(56) References Cited

U.S. PATENT DOCUMENTS

| 7,127,246 | B1* | 10/2006 | Muhonen | H04W 8/06 455/432.1 |
| 8,582,515 | B2 | 11/2013 | Schuringa et al. | |
| 2012/0252481 | A1* | 10/2012 | Anpat | H04W 8/06 455/456.1 |
| 2013/0157661 | A1* | 6/2013 | Bhaskaran | H04W 60/00 455/436 |
| 2013/0304857 | A1* | 11/2013 | Li | H04W 8/186 709/217 |
| 2014/0323146 | A1* | 10/2014 | Stenfelt | H04L 41/0893 455/456.1 |
| 2015/0334042 | A1* | 11/2015 | Katayama | H04L 47/743 455/452.2 |

OTHER PUBLICATIONS

LTE; General Packet Radio Service (GPRS) enhancements for Evolved Universal Terrestrial Radio Access Network (E-UTRAN) access (3GPP TS 23.401 version 10.11.0 Release 10).

* cited by examiner

*Primary Examiner* — Kashif Siddiqui

(57) ABSTRACT

In systems and methods of establishing an attachment between a wireless device and a communication network, an attachment request is received from the wireless device, an access node, or both, and an update location request is transmitted to a subscriber database. A create session request is transmitted to a gateway node before an update location answer is received from the subscriber database.

18 Claims, 6 Drawing Sheets

SYSTEMS AND METHODS FOR WIRELESS DEVICE ATTACHMENT IN A COMMUNICATION NETWORK

TECHNICAL BACKGROUND

Wireless communication can be used as a means of accessing a communication network. Wireless communication has certain advantages over wired communications for accessing a network. For example, implementing a wireless interface can eliminate a need for a wired infrastructure, thereby reducing the cost of building and maintaining network infrastructure. In addition, a wireless network can support added mobility by allowing a wireless device to access the network from various locations or addresses.

In many wireless communication systems, when a wireless device attempts to access the network by attaching or reattaching to the network, the wireless device is serviced through one or more access nodes of the communication system. The access nodes coordinate with one or more controller and/or gateway nodes to establish a connection that places the wireless device in communication with the network. In typical systems, the user of the wireless device must wait until the device is authenticated and the connection is established before exchanging data with the communication network.

OVERVIEW

In operation, an attachment is established between a wireless device and a communication network. An attachment request is received from the wireless device, an access node, or both, and an update location request is transmitted to a subscriber database. A create session request is transmitted to a gateway node before an update location answer is received from the subscriber database.

DETAILED DESCRIPTION

Figure 1:
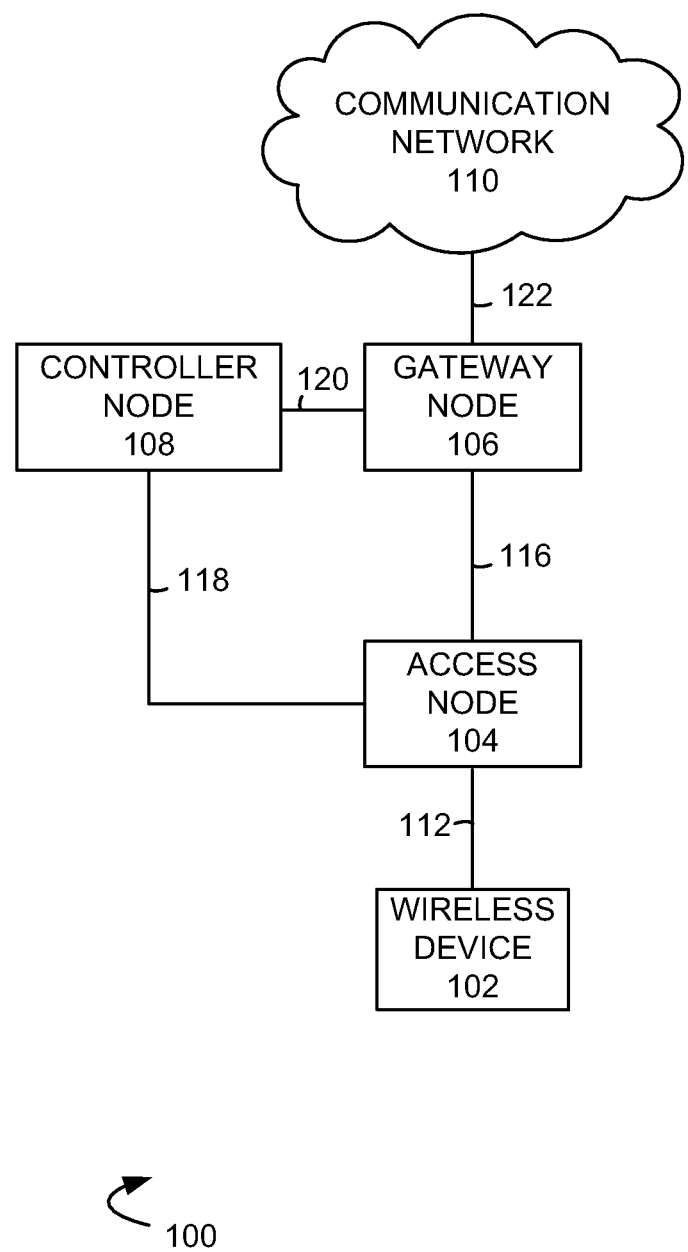
FIG. 1 illustrates an exemplary communication system for transmitting data between a communication network and a wireless device.

FIG. 1 illustrates an exemplary communication system 100 to process a call request. The illustrated communication system 100 includes wireless device 102, access node 104, gateway node 106, controller node 108, and communication network 110. Examples of wireless device 102 include, but are not limited to, a cell phone, a smart phone, a computing platform such as a laptop, palmtop, or tablet, a personal digital assistant, or an internet access device, including combinations thereof. Wireless device 102 can communicate with access node 104 over communication link 112. Communication link 112 may include a frequency band. While one frequency band illustrated in FIG. 1 for conciseness, access node 104 and wireless device 102 can also communicate over a greater number of frequency bands in other embodiments.

Access node 104 is a network node capable of providing wireless communications to wireless device 102, and can be, for example, a base transceiver station, a radio base station, an eNodeB device, or an enhanced eNodeB device. Access node 104 is in communication with gateway node 106 over communication link 116, and with controller node 108 over communication link 118.

Gateway node 106 can include a processor and associated circuitry to execute or direct the execution of computer-readable instructions, and can be configured to maintain network connection information associated with wireless device 102. Gateway node 106 can retrieve and execute software from storage, which can include a disk drive, flash drive, memory circuitry, or some other memory device, and which can be local or remotely accessible. The software may include computer programs, firmware, or some other form of machine-readable instructions, and may further include an operating system, utilities, drivers, network interfaces, applications, or some other type of software, including combinations thereof. Gateway node 106 can receive instructions and other input at a user interface. Examples of gateway node 106 can include a standalone computing device, a computer system, or a network component, such as an access service network gateway (ASN-GW), a packet data network gateway (PGW), a serving gateway (SGW), a mobile switching controller (MSC), a packet data serving node (PDSN), call processing equipment, a home agent, a radio node controller (RNC), a subscriber profile system (SPS), authentication, authorization, and accounting (AAA) equipment, and a network gateway, including combinations thereof. Gateway node 106 is in communication with controller node 108 over communication link 120 and with communication network 110 over communication link 122.

Controller node 108 can include a processor and associated circuitry to execute or direct the execution of computer-readable instructions, and can be configured to control the setup and maintenance of a communication session over communication network 110 for wireless device 102, as well as to maintain network connection information associated with wireless device 102. Controller node 108 can include a mobile switching center (MSC), a dispatch call controller (DCC), a mobility management entity (MME), a home subscriber server (HSS), or other similar network nodes. For example, in one embodiment, the controller node 108 may include a MME and may be configured to communicate with an external HSS, for example, to authenticate the wireless device 102 when the wireless device 102 is attempting to access the communication network 110.

Controller node 108 can retrieve and execute software from storage, which can include a disk drive, flash drive, memory circuitry, or some other memory device, and which can be local or remotely accessible. The software may include computer programs, firmware, or some other form of machine-readable instructions, and may further include an operating system, utilities, drivers, network interfaces, applications, or some other type of software, including combinations thereof. Controller node 108 can receive instructions and other input at a user interface.

Communication network 110 can be a wired and/or wireless communication network, and can include processing nodes, routers, gateways, and physical and/or wireless data links for carrying data among various network elements, including combinations thereof, and can include a local area network, a wide area network, and/or an internetwork (including the Internet). Communication network 110 can be capable of carrying voice information and other data, for example, to support communications by a wireless device, such as wireless device 102. Wireless network protocols may include code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). Wired network protocols that may be utilized by communication network 410 include Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also include a wireless network, including base stations, wireless communication nodes, telephony switches, internet routers, network gateways, computer systems, communication links, or some other type of communication equipment, and combinations thereof.

Communication links 112, 116, 118, 120 and 122 can be wired or wireless communication links. Wired communication links can include, for example, twisted pair cable, coaxial cable or fiber optic cable, or combinations thereof. Wireless communication links can include a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), or combinations thereof. Other wireless protocols can also be used.

Other network elements may be present in communication system 100 to facilitate wireless communication, but such elements are omitted for clarity. Network elements that may be present in other embodiments may include, but are not limited to, base stations, base station controllers, gateways, mobile switching centers, dispatch application processors, and location registers, such as a home location register or visitor location register. Furthermore, other network elements may be present to facilitate communication between access node 104, gateway node 106, controller node 108 and communication network 110, which are omitted for clarity, but may include additional processing nodes, routers, gateways, and physical and/or wireless data links for carrying data among the various network elements.

In a typical communication system, when the wireless device 102 requests attachment to the communication network 110, the call flow may require that the controller node 108 receive one or more responses from other system components before proceeding to set up access for the wireless device 102. For example, in embodiments in which the wireless protocol is LTE, the controller node 108 may include a mobility management entity (MME) that probes a home subscriber server (HSS) for an updated location answer and waits to receive such an answer before initiating the creation of a new session for the wireless device 102. In such traditional systems, this delay in setting up the data plane for the user's session may undesirably increase a waiting time before the wireless device 102 can access the communication network 110.

However, in some embodiments of the presently disclosed communication system 100, in operation, the system 100 may reduce the waiting time before the wireless device 102 can access the communication network 110. For example, in some embodiments, the system 100 may operate such that it is not necessary for the controller node 108 to receive an update location answer from a subscriber database before transmitting a create session request to initiate the new session for the wireless device 102. Instead, in some presently disclosed embodiments, the controller node 108 may utilize stored information from a previous session of the wireless device 102 to initiate setup of the new session in parallel with the update location procedures, thereby increasing efficiency and establishing the data path more quickly as compared to traditional call flows.

Figure 2:
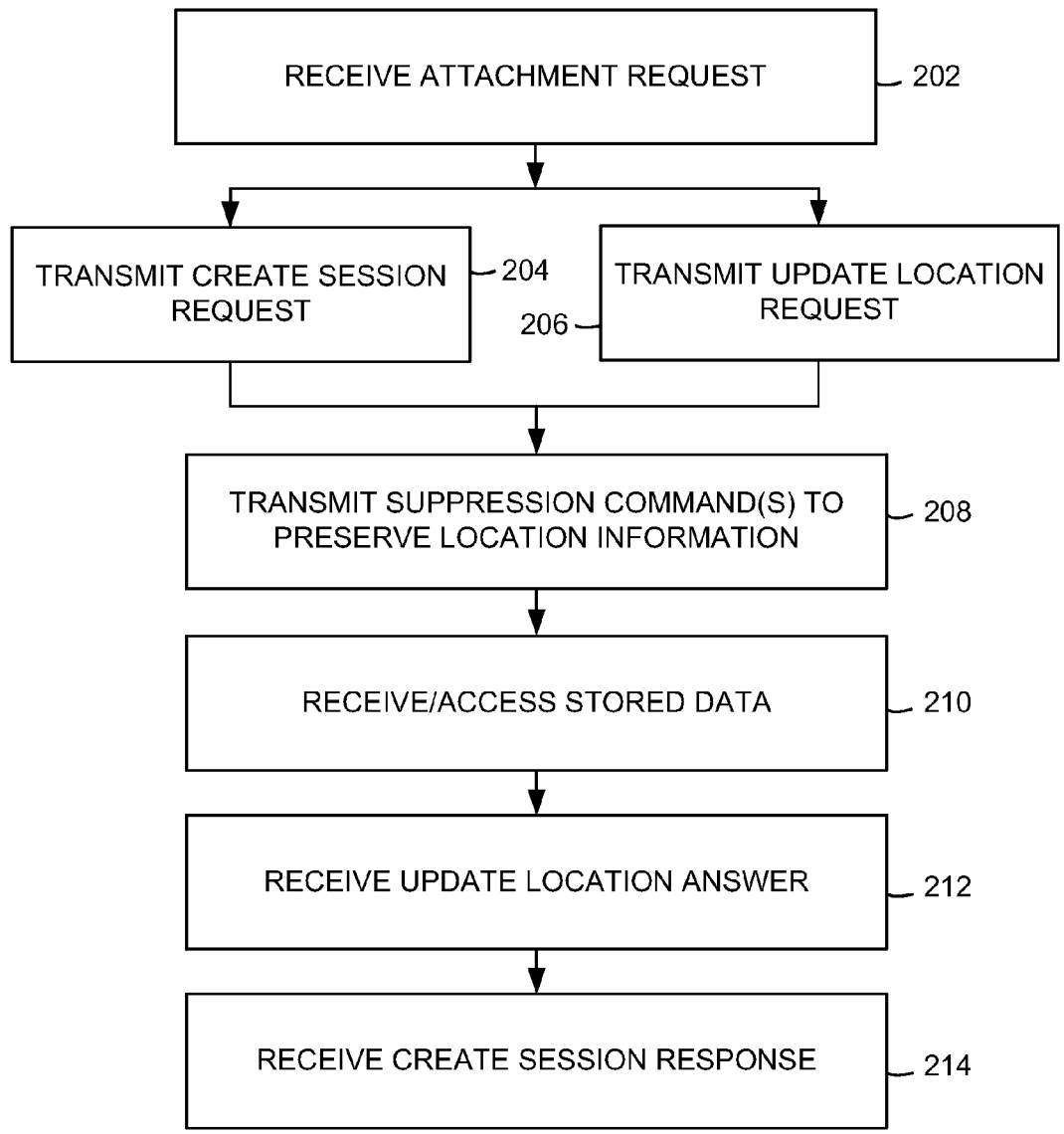
FIG. 2 illustrates an exemplary method of establishing an attachment between a wireless device and a communication network.

In the embodiment shown in FIG. 2, a method illustrates an attachment procedure that may be utilized to process an attachment request from the wireless device 102. In the illustrated embodiment, the method includes receiving an attachment request (block 202). For example, the controller node 108 may receive the attachment request from the wireless device 102 when the wireless device 102 would like to communicate with the communication network 110.

The method further includes transmitting a create session request (block 204) and transmitting an update location request (block 206). The update location request may be sent, for example, from an MME to a HSS to update the location of the wireless device 102 with the HSS. The create session request may be sent, for instance, from an MME to a serving gateway (SGW) to initiate creation of a GPRS tunneling protocol (GTP) tunnel, which enables delivery of data packets from a wireless device to a packet data network (PDN) gateway (PGW) through the GTP tunnel.

In some embodiments, the create session request and the update location request may be transmitted concurrently or in parallel, or the transmission of such requests may be initiated concurrently but sent with a delay. However, in other embodiments, the transmission of the requests may be performed in series, with transmission of one request following the transmission of the other. Still further, in some embodiments, the create session request may be transmitted prior to the receipt of one or more answering signals, such as an update location answer. Additionally, in some embodiments, the create session request may be generated without regard for whether the update location answer has been received. In certain embodiments, the foregoing features may enable the method of FIG. 2 to be utilized to set up a data path between, for example, wireless device 102 and communication network 110, more quickly and/or efficiently as compared to traditional systems that wait for an answer before transmitting the create session request.

In the embodiment of FIG. 2, the method proceeds with transmission of one or more suppression commands to preserve stored location information (block 208). For example, in one embodiment, a new MME servicing a wireless device may transmit a suppression command to a subscriber database to prevent the subscriber database from sending a cancel location message to an old MME that previously serviced the wireless device. The new MME may also suppress a cancel location acknowledgement sent from the old MME to the subscriber database. In traditional systems, a cancel location request is sent from the subscriber database to the old MME. However, in some presently disclosed embodiments, the subscriber database may suppress sending the cancel location request to the old MME. In other embodiments, the old MME, upon receiving the cancel location request, may suppress deletion of the UE context and flag the subscriber as deregistered if a deregistration procedure didn't already occur. In this way, the information stored in the old MME from a prior session with the wireless device may be preserved for additional utilization in creating a new session.

The method further includes receiving or accessing the stored data that has not been cleared from the previous controller node servicing the wireless device (block 210). This stored data may be utilized to generate the create session request before receiving the update location answer (block 212), thus enabling the create session response to be received (block 214) more quickly than in conventional systems. That is, the information stored from a prior session of the wireless device may be utilized as a substitute for the information contained in the update location answer to enable the session creation process to be initiated earlier than in traditional call flows.

Figure 3:
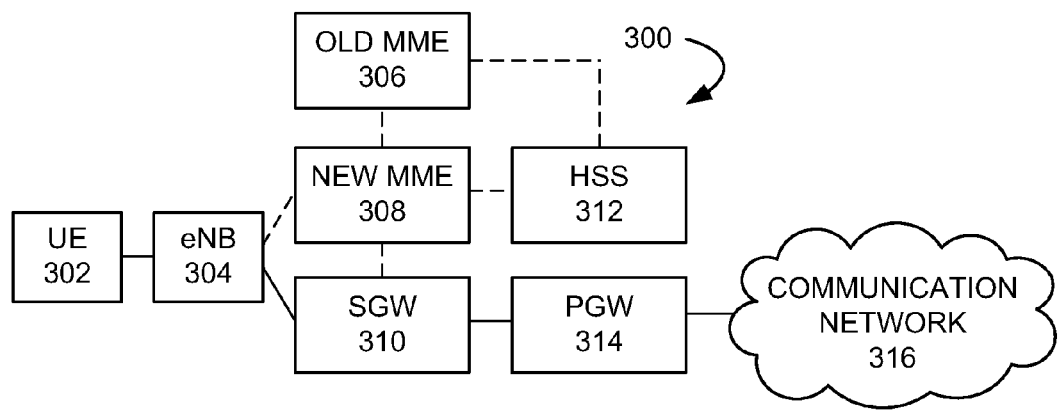
FIG. 3 is a schematic illustrating an exemplary network architecture for enabling attachment between a wireless device and a communication network.

FIG. 3 illustrates an exemplary network architecture 300 for enabling attachment between a wireless device and a communication network in accordance with one embodiment of the method of FIG. 2. The network architecture 300 includes user equipment (UE) 302, evolved base station (eNB) 304, old MME 306, new MME 308, SGW 310, home subscriber server (HSS) 312, PGW 314, and communication network 316. The UE 302 may include any wireless user device, such as wireless device 102. The eNB 304 may include one or more access nodes and is configured to support a variety of functions. For example, the eNB 304 bidirectionally communicates with the UE 302 to control the low-level operation of the UE 302 via signaling messages, such as handover commands. The high level operation of the UE 302 may be controlled by the new MME 308 via signaling messages and by accessing information stored on the HSS 312 and the old MME 306, which previously serviced the UE 302.

The HSS 312 may be a central database that includes information about the network operator's subscribers. For example, the HSS 312 may include subscription data, such as a Quality of Service (QoS) profile and any access restrictions for roaming. The HSS 312 may also include information about the packet data networks (PDNs) to which the user may connect, which may include an access point name (APN) or a PDN address. Additionally, the HSS 312 may store information related to the MME 308 to which the UE 302 is currently attached or registered and may generate vectors for authentication and security keys.

In operation, the UE 302 accesses the communication network 316 via a data pathway coordinated through eNB 304. The data pathway is established along the solid lines in FIG. 3 from UE 302, to eNB 304, to SGW 310, to PGW 314, and to communication network 316; data may also flow in the opposite direction along the same pathway. Further, various communication signals are transmitted along the pathways shown in dashed lines in FIG. 3, for example, between eNB 304 and new MME 308, between new MME 308 and old MME 306, between new MME 308 and SGW 310, and between new MME 308 and HSS 312.

Figure 4:
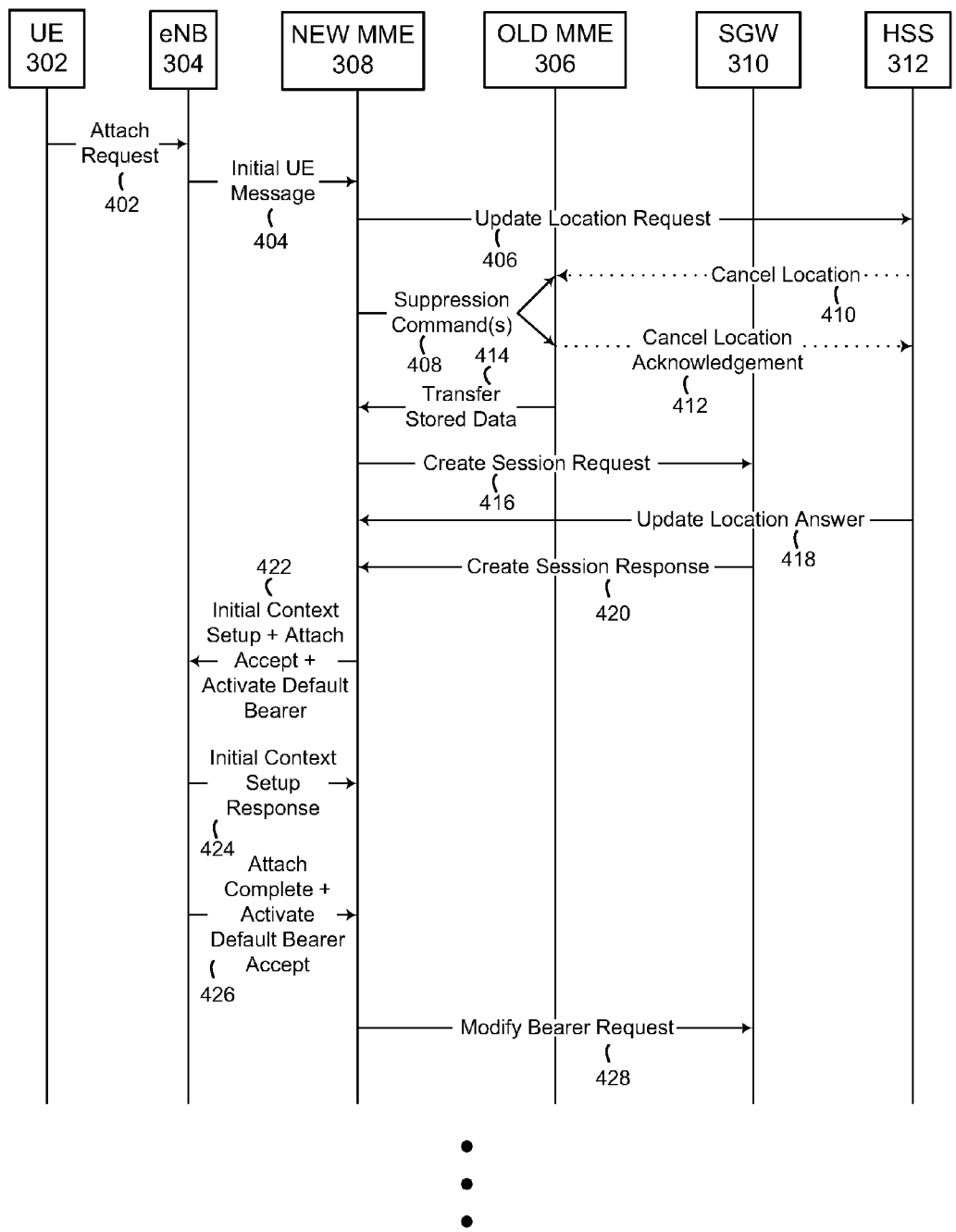
FIG. 4 is a schematic illustrating an exemplary attachment procedure.

FIG. 4 is a schematic illustrating an attachment procedure that may be performed by the network architecture 300 of FIG. 3 in accordance with one disclosed embodiment. However, it should be noted that the steps and order of the steps shown in the illustrated attachment procedure, as well as the methods generally disclosed herein, are merely examples. Indeed, the steps shown in FIG. 4 and the foregoing methods may be performed in a variety of suitable orders, depending on implementation-specific considerations.

In the embodiment shown in FIG. 4, the attachment procedure begins when the UE 302 transmits an attachment request to the eNB 304 at 402, thereby requesting establishment of a connection. In response to this request, the eNB transmits an initial UE message to the new MME 308 at 404 to indicate to the new MME 308 that the UE 302 would like to establish a connection. One or more authentication procedures (not shown) may then occur to authenticate the UE 302. An update location request is then sent from the new MME 308 to the HSS 312 at 406. The new MME 308 sends this request in order to update the UE 302 location with the HSS 312.

The new MME 308 also transmits one or more suppression commands at 408. For example, in the illustrated embodiment, a first suppression command is sent from the new MME 308 to the HSS 312 to suppress the cancel location message at 410, which the HSS 312 would typically send to the old MME 306 upon receipt of the update location request at 406. For further example, a second suppression command is also sent from the new MME 308 to the old MME 306 to suppress the cancel location acknowledgement that would typically be sent to the HSS 312 at 412. In this way, the attachment procedure may provide for previously stored data in the old MME 306 to be retained for transfer to the new MME 308 at 414.

The new MME 308 may then utilize the stored data, for example, instead of newly received or updated data, to generate the create session request at 416, which is sent to the SGW 310. The stored data that is utilized to generate the create session request at 416 may include data, such as user information, that would typically be provided in the update location answer at 418. Such data stored from a prior UE session may include subscription data containing one or more PDN subscription contexts, which may each contain an evolved packet system (EPS) subscribed quality of service (QoS) profile, which contains the bearer level QoS parameters associated with the default bearer for the access point name (APN), and the subscribed APN-aggregate maximum bit rate (AMBR), which contains information about allowable bit rates.

By utilizing stored data from a prior session instead of waiting for updated data, the new MME 308 may generate the create session request at 416 prior to receiving an update location answer from the HSS 312 at 418. In some embodiments, the new MME 308 may generate the update location request at 406 in parallel with the create session request at 416. In such embodiments, the transfer of the stored data at 414 may occur earlier than shown in the illustrated embodiment, for example, prior to the sending of the update location request at 406.

In response to the create session request at 416, the SGW 310 generates and transmits a create session response at 420. In some embodiments, when the SGW 310 receives the create session request at 416 from the new MME 308, the SGW 310 probes the PGW 314 to establish the bearer. Once the PGW 314 establishes the bearer and responds to the SGW 310, the SGW 310 responds back to the new MME 308 via the create session response at 420, and the default bearer is established.

A series of messages are then exchanged between the new MME 308 and the eNB 304 at 422. First, an initial context setup request is made by the new MME 308 to establish a context between the new MME 308 and the eNB 304. Second, an attach accept message is transmitted by the new MME 308 to acknowledge that the attachment to the UE 302 has been successful. Alternatively, if the attachment has not been successful, the acknowledgement would indicate a failure of the attachment. Third, an activate default bearer request is sent to the eNB 304 to initiate the default bearer setup on the UE 302.

The eNB 304 then responds at 424 and 426 to the messages sent at 422 from the new MME 308. Specifically, at 424, the eNB 304 sends an initial context setup response that, among other functions, confirms establishment of the GTP tunnel. Further, at 426, the eNB 304 completes the attachment and default bearer activation by sending attachment complete and activate default bearer accept messages to the new MME 308. The illustrated procedure then includes sending a modify bearer request to the SGW 310 at 428 to inform the SGW 310 about information regarding the eNB's user plane IP address.

Figure 5:
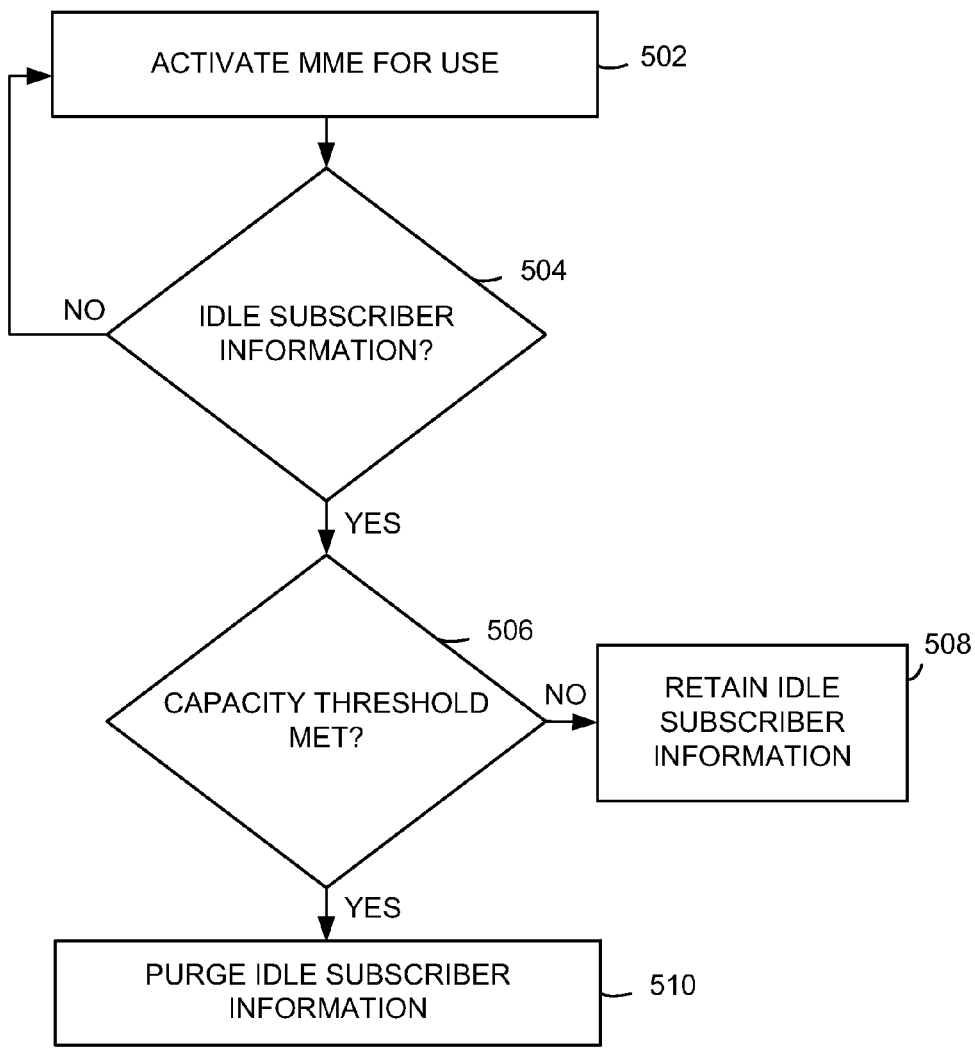
FIG. 5 illustrates an exemplary method of handling subscriber information in a controller node.

As discussed in detail above, for instances in which a user has previously visited an old MME 306, or a single MME that services a later session as well, the details provided in the update location answer that are necessary for the create session request may have already been stored in the memory of the old MME 306 from prior attach and mobility procedures. By utilizing the content already stored in the old MME 306 from prior sessions, the new MME 308 can initiate the create session request as soon as the authentication procedures are complete. In order to enable the presently disclosed methods and attachment procedures, in some embodiments, it may be desirable to alter the handling of the idle subscriber information in a controller node, such as old MME 306. FIG. 5 illustrates one embodiment of a method for handling idle subscriber information in a controller node.

Specifically, the method shown in FIG. 5 includes activating the controller node for use (block 502) and inquiring as to whether idle subscriber information is stored in the controller node memory (block 504). If idle subscriber information is stored in the controller node memory, the method proceeds by inquiring if a memory capacity threshold has been met (block 506). When the capacity threshold has not been met, idle subscriber information is retained by the controller node (block 508). When the capacity threshold has been met, the idle subscriber information is purged (block 510). That is, in some embodiments, the controller node may only purge idle subscriber information when the capacity threshold has been met, thus increasing the retention period of the idle subscriptions, for example, by not purging subscriber details due to subscriber mobility.

Figure 6:
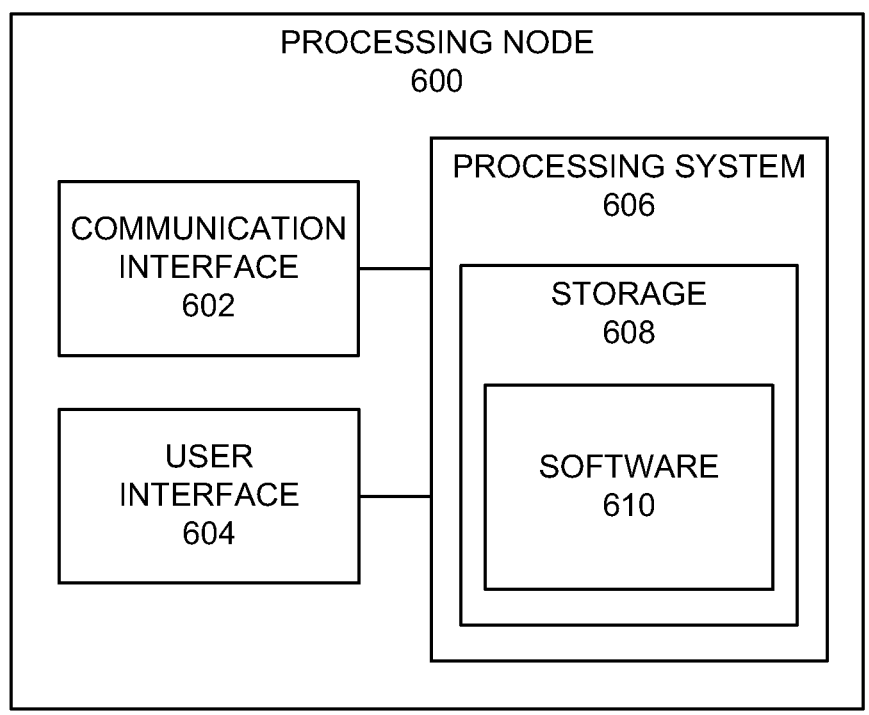
FIG. 6 illustrates an exemplary processing node.

FIG. 6 illustrates an exemplary processing node 600 in a communication system. Processing node 600 includes communication interface 602, user interface 604, and processing system 606 in communication with communication interface 602 and user interface 604. Processing node 600 can be configured to instruct the sending of data packets to a wireless device. Processing system 606 includes storage 608, which can include a disk drive, flash drive, memory circuitry, or other memory device. Storage 608 can store software 610, which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access node 104, access node 404, gateway node 406, and controller node 408. Processing node 600 can also be an adjunct or component of a network element, such as an element of access node 104, access node 404, gateway node 406, or controller node 408. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for establishing an attachment between a wireless device and a communication network, comprising:
    receiving an attachment request from the wireless device, an access node, or both;
    transmitting an update location request to a subscriber database; and
    transmitting a create session request to a gateway node before receiving an update location answer from the subscriber database,
    wherein the update location request and the create session request are transmitted concurrently.

2. The method of claim 1, further comprising:
transmitting one or more suppression commands to a controller node previously associated with the wireless device to prevent purging of data associated with the wireless device.

3. The method of claim 2, wherein the one or more suppression commands comprises a command to suppress a cancel location message from the subscriber database to the controller node previously associated with the wireless device.

4. The method of claim 2, wherein the one or more suppression commands comprise a command to suppress a cancel location acknowledgement from the controller node previously associated with the wireless device to the subscriber database.

5. The method of claim 1, comprising receiving data stored by a controller node previously associated with the wireless device and utilizing the data to generate the create session request.

6. The method of claim 1, comprising retaining idle subscriber information in a memory when a memory capacity threshold has not been met.

7. A wireless communication system, comprising:
a gateway node;
a subscriber database configured to store information regarding subscribers of a network operator; and
a controller node configured to:
receive an attachment request from a wireless device of one of the subscribers of the network operator;
transmit an update location request to the subscriber database in response to the attachment request;
utilize information from a prior session of the wireless device to generate a create session request, and to;
transmit the create session request to the gateway node.

8. The system of claim 7, wherein the subscriber database is configured to transmit an update location answer to the controller node in response to the update location request.

9. The system of claim 7, wherein the controller node is configured to transmit the create session request before receiving an update location answer from the subscriber database.

10. The system of claim 7, further comprising a second controller node configured to:
control the prior session of the wireless device;
receive a cancel location message from the subscriber database; and
transmit a cancel location acknowledgement to the subscriber database in response to the cancel location message.

11. The system of claim 10, wherein the controller node is further configured to:
transmit one or more commands to the second controller node, the subscriber database, or both to suppress the cancel location message and the cancel location acknowledgement.

12. The system of claim 7, further comprising a second controller node configured to control the prior session of the wireless device and to transmit the information from the prior session of the wireless device to the controller node.

13. The system of claim 7, wherein the gateway node is configured to transmit a create session response to the controller node in response to the create session request.

14. The system of claim 7, wherein the controller node is configured to transmit the update location request and the create session request concurrently.

15. A system for establishing an attachment between a wireless device and a communication network, the system comprising:
a controller node configured to:
receive an attachment request from the wireless device, an access node, or both;
transmit an update location request to a subscriber database; and
transmit a create session request to a gateway node without regard to whether an update location answer has been received from the subscriber database,
wherein the update location request and the create session request are transmitted concurrently.

16. The system of claim 15, wherein the controller node is configured to transmit one or more suppression commands to a second controller node previously associated with the wireless device to prevent purging of data associated with the wireless device.

17. The system of claim 15, wherein the controller node is configured to retain idle subscriber information when a memory capacity threshold has not been exceeded.

18. The system of claim 15, wherein the controller node is configured to transmit the create session request to the gateway node before an update location answer has been received from the subscriber database.

* * * * *